United States Patent
Richardson et al.

(10) Patent No.: US 6,874,148 B1
(45) Date of Patent: Mar. 29, 2005

(54) SYSTEM AND METHOD FOR EXPORTING A GRAPHICAL PROGRAM TO A SHARED LIBRARY

(75) Inventors: Greg Richardson, Round Rock, TX (US); Steve Rogers, Austin, TX (US)

(73) Assignee: National Instruments Corporation, Austin, TX (US)

(*) Notice: Subject to any disclaimer, the term of this patent is extended or adjusted under 35 U.S.C. 154(b) by 525 days.

(21) Appl. No.: 09/594,226

(22) Filed: Jun. 14, 2000

(51) Int. Cl.[7] .............................. G06F 3/00; G06F 9/44; G06F 9/46; G06F 13/00
(52) U.S. Cl. ...................... 719/328; 719/331; 717/107
(58) Field of Search ........................ 719/310, 311–316, 719/328–331; 717/100–113, 162–167, 133, 144, 157; 709/331, 332; 345/762, 763, 771, 967

(56) References Cited

U.S. PATENT DOCUMENTS

| | | | | |
|---|---|---|---|---|
| 5,146,593 A | * | 9/1992 | Brandle et al. | 709/328 |
| 5,163,130 A | * | 11/1992 | Hullot | 345/763 |
| 5,860,004 A | * | 1/1999 | Fowlow et al. | 717/109 |
| 5,883,639 A | * | 3/1999 | Walton et al. | 345/473 |
| 6,064,812 A | | 5/2000 | Parthasarathy et al. | |
| 6,102,965 A | | 8/2000 | Dye et al. | |
| 6,189,138 B1 | * | 2/2001 | Fowlow et al. | 717/107 |
| 6,351,778 B1 | * | 2/2002 | Orton et al. | 709/310 |
| 6,389,588 B1 | * | 5/2002 | Wadhwa et al. | 717/106 |

OTHER PUBLICATIONS

Munro, Writing DLLs for Windows using Visual Basic, part 1, PC Magazine, v11, n11, p. 379(6).*
LabVIEW Function Reference Manual, Aug. 1993 Edition, pp 10–11 and 10–12.
LabVIEW Code Interface Reference Manual, Dec. 1993.

* cited by examiner

Primary Examiner—Meng-Al T. An
Assistant Examiner—Diem Cao
(74) Attorney, Agent, or Firm—Meyertons Hood Kivlin Kowert & Goetzel, P.C.; Jeffrey C. Hood; Jason L. Burgess

(57) ABSTRACT

System and method for enabling a program to call into graphical program code via a shared library. A graphical programming system may export a graphical program to a shared library, such as a Windows Dynamic Link Library (DLL), Unix Shared Library, etc. A program, e.g. a text-based program, may then use the shared library to call into the graphical program. Graphical programs or subprograms may have associated inputs or outputs of various data types. When creating a shared library, a functional interface specifying parameterized versions of these inputs and outputs may be specified, either automatically or interactively. A program may then utilize this functional interface to construct an appropriate call into the shared library. A user interface enabling users to specify the mapping of graphical program inputs and outputs onto parameters of the functional interface is described. Multiple graphical programs or subprograms may be exported to a shared library. The shared library may include an entry point function associated with each graphical program or subprogram. When a program calls into the entry point associated with a particular graphical program, the entry point function may manipulate or copy the parameters passed by the calling program into a representation expected by the graphical program.

38 Claims, 11 Drawing Sheets

SYSTEM AND METHOD FOR EXPORTING A GRAPHICAL PROGRAM TO A SHARED LIBRARY

FIELD OF THE INVENTION

The present invention relates to the field of graphical programming, and more particularly to a system and method for enabling a program to call into graphical program code via a shared library.

DESCRIPTION OF THE RELATED ART

Traditionally, high level text-based programming languages have been used by programmers in writing applications programs. Many different high level programming languages exist, including BASIC, C, FORTRAN, Pascal, COBOL, ADA, APL, etc. Programs written in these high level languages are translated to the machine language level by translators known as compilers or interpreters. The high level programming languages in this level, as well as the assembly language level, are referred to as text-based programming environments.

Increasingly computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptually model a system and then to program a computer to model that system. Since a user often is not fully proficient in techniques for programming a computer system in a text-based environment to implement his model, the efficiency with which the computer system can be utilized to perform such modeling often is reduced.

Examples of fields in which computer systems are employed to model and/or control physical systems are the fields of instrumentation, process control, industrial automation, and simulation. Computer modeling or control of devices such as instruments or industrial automation hardware has become increasingly desirable in view of the increasing complexity and variety of instruments and devices available for use. However, due to the wide variety of possible testing/control situations and environments, and also the wide array of instruments or devices available, it is often necessary for a user to develop a program to control a desired system. As discussed above, computer programs used to control such systems had to be written in conventional text-based programming languages such as, for example, assembly language, C, FORTRAN, BASIC, or Pascal. Traditional users of these systems, however, often were not highly trained in programming techniques and, in addition, traditional text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered the highest and most intuitive way in which to interact with a computer. A graphically based programming environment can be represented at a level above text-based high level programming languages such as C, Pascal, etc. The method disclosed in Kodosky et al allows a user to construct a diagram using a block diagram editor, such that the diagram created graphically displays a procedure or method for accomplishing a certain result, such as manipulating one or more input variables to produce one or more output variables. In response to the user constructing a data flow diagram or graphical program using the block diagram editor, data structures are automatically constructed which characterize an execution procedure which corresponds to the displayed procedure. The graphical program may be compiled or interpreted by a computer. Therefore, a user can create a computer program solely by using a graphically based programming environment. This graphically based programming environment may be used for creating virtual instrumentation systems, industrial automation systems, modeling processes, and simulation, as well as for any type of general programming.

Therefore, Kodosky et al teaches a graphical programming environment wherein a user places or manipulates icons in a block diagram using a block diagram editor to create a data flow "program." A graphical program for controlling or modeling devices, such as instruments, processes or industrial automation hardware, may be referred to as a virtual instrument (VI). In creating a virtual instrument, a user may create a front panel or user interface panel. The front panel includes various user interface elements or front panel objects, such as controls or indicators, that represent or display the respective input and output that will be used by the graphical program or VI, and may include other icons which represent devices being controlled. The front panel may be comprised in a single window of user interface elements, or may comprise a plurality of individual windows each having a user interface element, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel objects, e.g., the GUI, may be embedded in the block diagram.

During creation of the graphical program, the user may select various function nodes or icons that accomplish his desired result and connect the function nodes together. For example, the function nodes may be connected in a data flow or control flow format. The function nodes may be connected between the terminals of the respective controls and indicators. Thus the user may create or assemble a data flow program, referred to as a block diagram, representing the graphical data flow which accomplishes his desired process. The assembled graphical program may then be compiled or interpreted to produce machine language that accomplishes the desired method or process as shown in the block diagram.

A user may input data to a virtual instrument using front panel controls. This input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, and machine vision applications, among others.

As the use of graphical programming has increased, it has become more important to enable graphical programs to interface with other types of executable code. One common way for interfacing between different portions of executable code is to use a standard shared library. Many computing platforms support standard shared libraries. For example, the Windows platform supports Dynamic Link Libraries (DLLs), the Unix platform supports Shared Libraries, and the Macintosh platform supports Code Fragments. Many programming environments, including text-based programming environments, support the creation and use of these types of standard shared libraries.

Some current graphical programming environments provide a node for calling a standard shared library from within a graphical program. In this way, graphical programs can utilize other types of executable code, including code created from a text-based programming language. However, it is often desirable to provide the reverse functionality, in which another program can call into a graphical program using a shared library. Previous approaches to enabling graphical programs to be called using shared libraries suffer from various drawbacks. For example, one approach in current use for the Windows platform is to create a DLL that has entry points that call a graphical program indirectly by interfacing with an ActiveX out-of-process server, where this ActiveX server is operable to invoke the desired graphical program. However, calling a graphical program using this method may be inefficient, since a process switch is involved. Also, this approach may require programmers to understand various aspects of the ActiveX framework. Thus, it may be desirable to enable programmers to call into graphical program code more easily and efficiently.

SUMMARY OF THE INVENTION

The problems outlined above may in large part be solved by a system and method for enabling a program to call into graphical program code via a shared library. A user may utilize a graphical programming system to create a graphical program and may then export this graphical program to a shared library. The graphical programming system may support the creation of any of various types of shared libraries, such as a Windows Dynamic Link Library (DLL), a Unix or Linux Shared Library, a Macintosh Code Fragment, etc. A program enabled to interface with the type of shared library created by the graphical programming system may then use the shared library to call into the graphical program. For example, the graphical programming system may create a Windows DLL, and a text-based C program running on the Windows environment may load and use the DLL.

Graphical programs or subprograms may have associated inputs or outputs of various data types. When creating a shared library from a graphical program, a functional interface specifying parameterized versions of these inputs and outputs may be specified, either automatically or interactively. A program may then utilize this functional interface to construct an appropriate call into the shared library. For example, for a graphical program with an integer input and an integer output, a C-style functional interface may be specified, such as:

int Funcname (int inputParm);

A user interface enabling users to specify the mapping of graphical program inputs and outputs onto parameters of the functional interface is described.

A user may specify multiple graphical programs or subprograms to export to a shared library. The shared library may include an entry point function associated with each graphical program or subprogram. When a program calls into the entry point associated with a particular graphical program, the entry point function may manipulate or copy the parameters passed by the calling program. For example, a graphical program may represent or store a particular data type differently than the calling program or the shared library specification. Thus, the entry point function may perform any necessary operations to transform the parameter into the format expected by the graphical program. The entry point function may also copy parameters into a location expected by the graphical program, such as a parameter table associated with the graphical program.

The entry point function may then call into the graphical program code. In one embodiment, a runtime execution system associated with the graphical programming system used to create the shared library may manage the execution of the graphical program code.

Thus, the present invention allows a graphical program to be exported to a shared library, thereby enabling any program able to access a shared library to be able to access a graphical program through a shared library.

BRIEF DESCRIPTION OF THE DRAWINGS

A better understanding of the present invention can be obtained when the following detailed description of the preferred embodiment is considered in conjunction with the following drawings, in which.

Figure 1A:
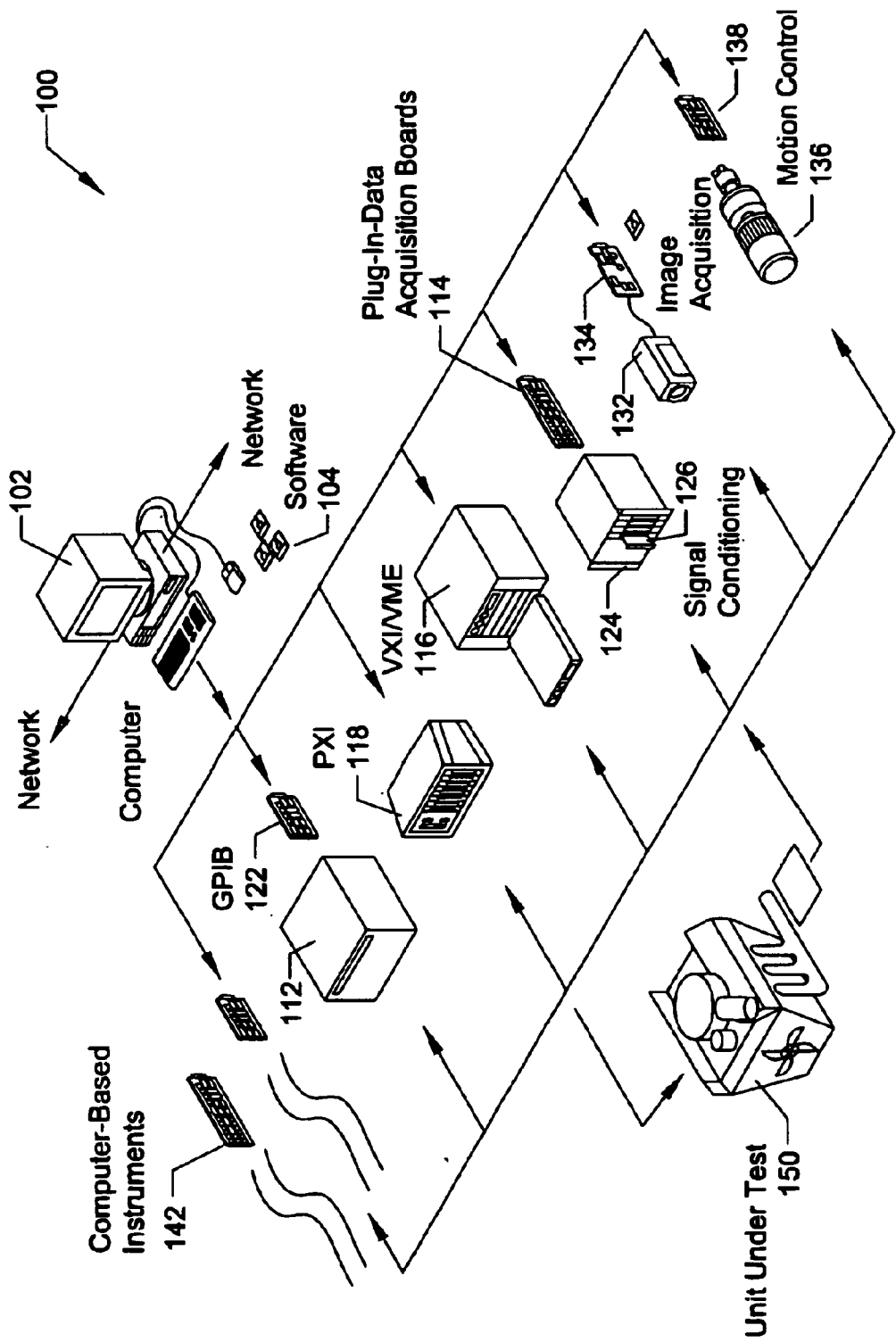
FIGS. 1A and 1B illustrate representative instrumentation and process control systems including various I/O interface options.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1B:
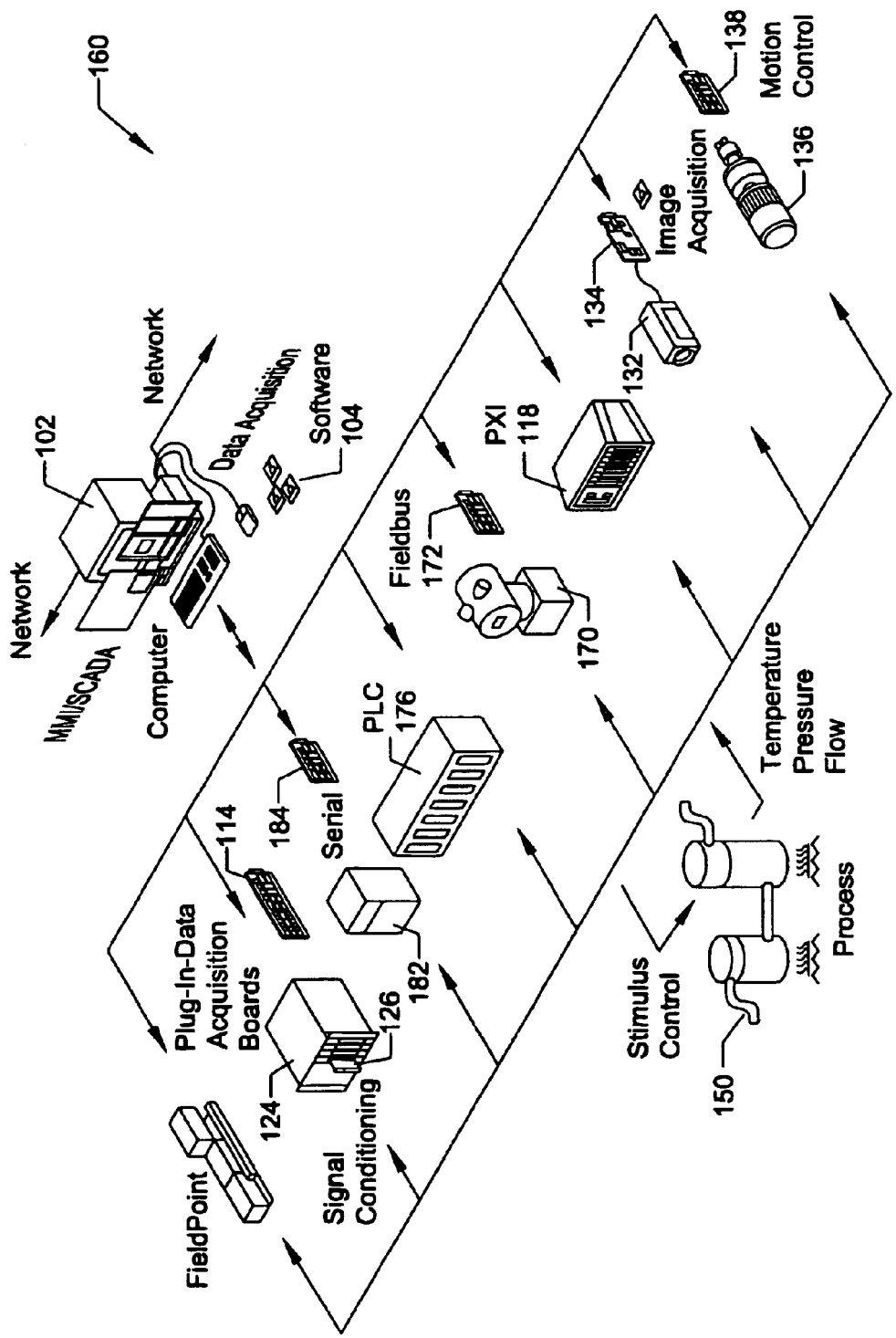

FIGS. 1A and 1B—Instrumentation and Industrial Automation Systems

FIGS. 1A and 1B illustrate exemplary systems that may store or execute graphical programs for instrumentation, process control, or other purposes. These programs may of course be stored in or used by other types of systems as desired. In accordance with the present system and method, code associated with the graphical programs may be included in a shared library that may be called by other programs, as described below.

FIG. 1A illustrates an instrumentation control system 100. The system 100 comprises a host computer 102 which connects to one or more instruments. The host computer 102 comprises a CPU, a display screen, memory, and one or more input devices such as a mouse or keyboard, as shown. The host computer 102 connects through the one or more instruments to analyze, measure, or control a unit under test (UUT) or process 150.

The host computer 102 may execute a graphical program which interacts with or controls the one or more instruments. The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via the GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI chassis or instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 1B illustrates an exemplary industrial automation system 160. The industrial automation system 160 is similar to the instrumentation or test and measurement system 100 shown in FIG. 1A. Elements which are similar or identical to elements in FIG. 1A have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control. In FIG. 1B, the computer 102 may execute a graphical program that is involved with the automation function performed by the automation system 160. Similarly as noted above with reference to FIG. 1A, the graphical program may be included in a shared library that may be called by other programs.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 102 as described above. The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 1A and 1B, the computer system 102 preferably includes a memory medium on which software according to the present invention may be stored. The memory medium preferably stores software for exporting a graphical program to a shared library. The memory medium also preferably stores a shared library created according to the present invention. The term "memory medium" is intended to include an installation medium, e.g., a CD-ROM, floppy disks 104, or tape device, a computer system memory or random access memory such as DRAM, SRAM, EDO RAM, RRAM, etc., or a non-volatile memory such as a magnetic media, e.g., a hard drive, or optical storage. The memory medium may comprise other types of memory as well, or combinations thereof.

In addition, the memory medium may be located in a first computer in which the shared library is stored or executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television set-top box, or other device. In general, the term "computer system" can be broadly defined to encompass any device having at least one processor which executes instructions from a memory medium.

In one embodiment, graphical program code that is included in a shared library as described herein may be designed for data acquisition/generation, analysis, and/or display, and for controlling or modeling instrumentation or industrial automation hardware. In a similar manner, a software program which calls the shared library may perform similar applications. For example, in one embodiment, the graphical program code may be created using the National Instruments LabVIEW graphical programming environment application, which provides specialized support for developers of instrumentation and industrial automation applications. However, it is noted that the present invention can be used for a plethora of applications and is not limited to instrumentation or industrial automation applications. In other words, FIGS. 1A and 1B are exemplary only, and shared libraries including graphical program code for any of various purposes may be stored in and execute on any of various types of systems to perform any of various applications.

Figure 2:
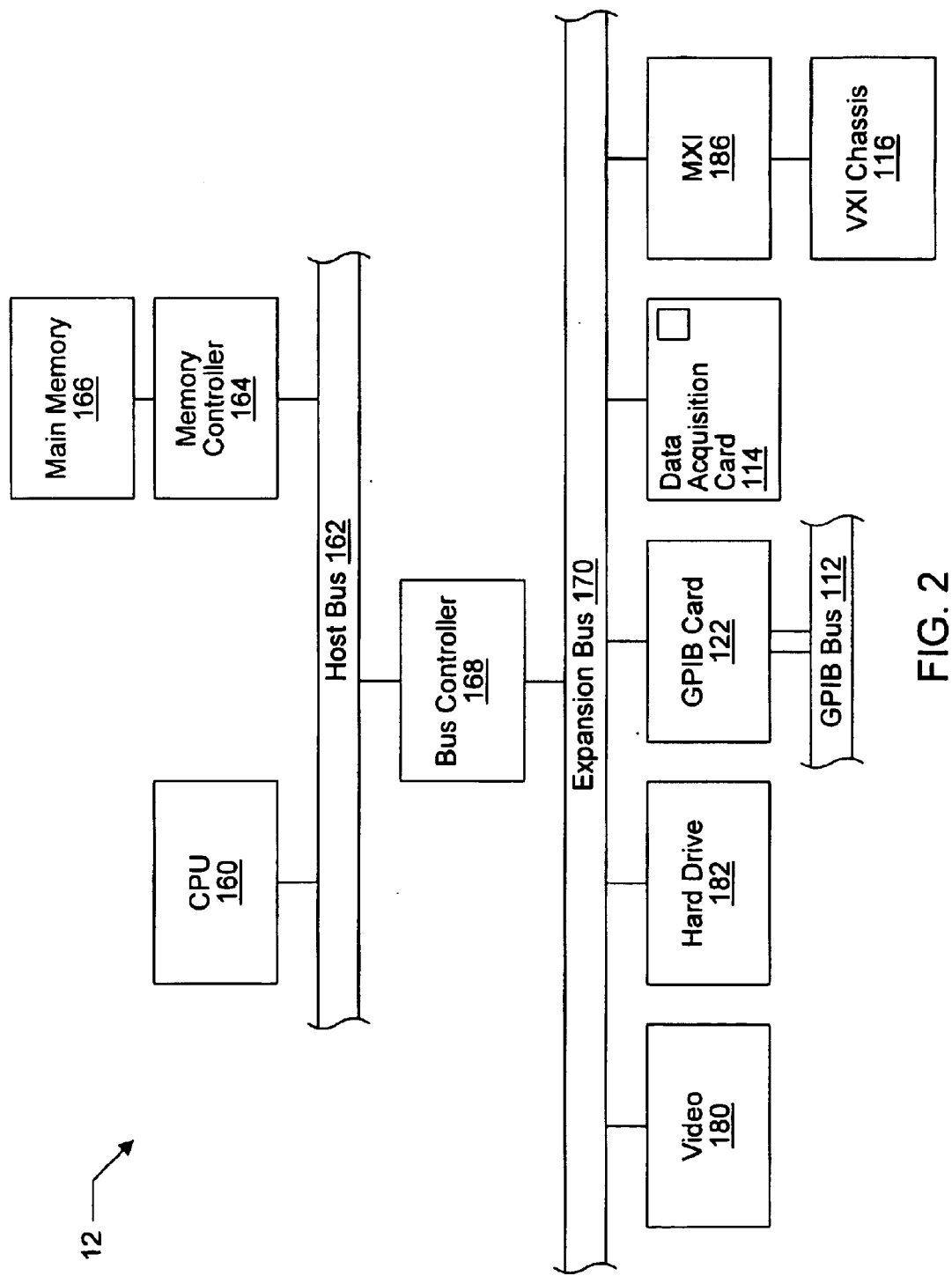
FIG. 2 is a block diagram of the computer system of FIGS. 1A and 1B.

FIG. 2—Computer System Block Diagram

FIG. 2 is an exemplary block diagram of the computer system illustrated in FIGS. 1A and 1B. It is noted that any type of computer system configuration or architecture can be used in conjunction with the system and method described herein, as desired, and FIG. 2 illustrates a representative PC embodiment. It is also noted that the computer system may be a general purpose computer system such as illustrated in FIGS. 1A and 1B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. The main memory 166 may store one or more computer programs or libraries according to the present invention. The main memory 166 also stores operating system software as well as the software for operation of the computer system, as well known to those skilled in the art.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 1A), a GPIB interface card 122 which provides a GPIB bus interface to the GPIB instrument 112 (of FIG. 2A), and a VXI or MXI bus card 186 coupled to the VXI chassis 116 for receiving VXI instruments. The computer 102 further comprises a video display subsystem 180 and hard drive 182 coupled to the expansion bus 170.

Figure 3A:
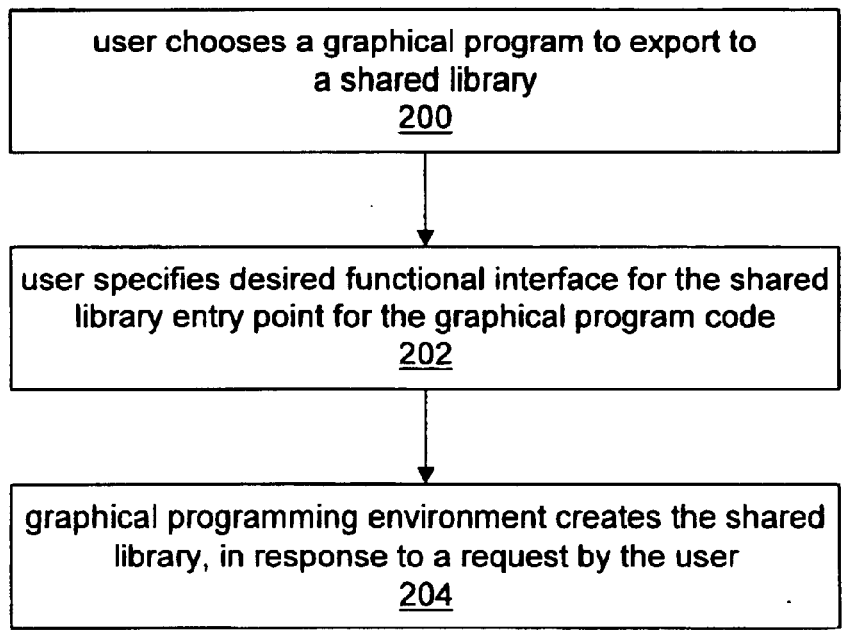
FIG. 3A is a flowchart diagram illustrating one embodiment of a method for creating a shared library including graphical program code.

FIG. 3A—Creating a Shared Library Including Graphical Program Code

FIG. 3 is a flowchart diagram illustrating one embodiment of a method for creating a shared library that includes graphical program code. In step 200, a user of a graphical programming system chooses a graphical program to export to a shared library. For example, FIGS. 4A and 4B illustrate one embodiment of a user interface for creating a shared library. In FIG. 4A, the user may set the "Build target" to be a shared library and may specify a file name and directory, as well as other options, for the shared library. The user may then utilize the user interface of FIG. 4B to choose one or more graphical programs to export to the shared library. It is noted that the desired graphical program(s) may be chosen in various other ways. For example, in an alternative embodiment, the graphical program to export may be specified implicitly in response to the user issuing an export command while working within the context of the graphical program.

Figure 5A:
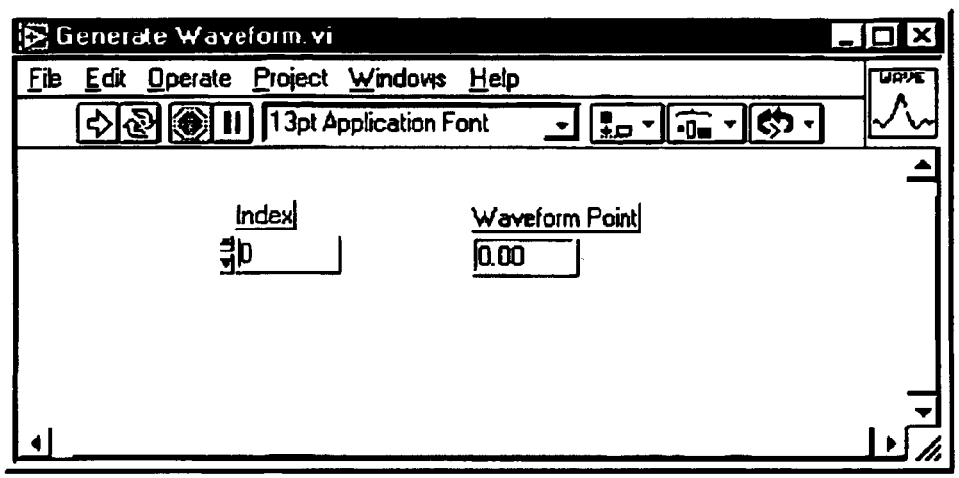
FIGS. 5A and 5B illustrate an exemplary graphical program and its user interface.
Figure 5B:
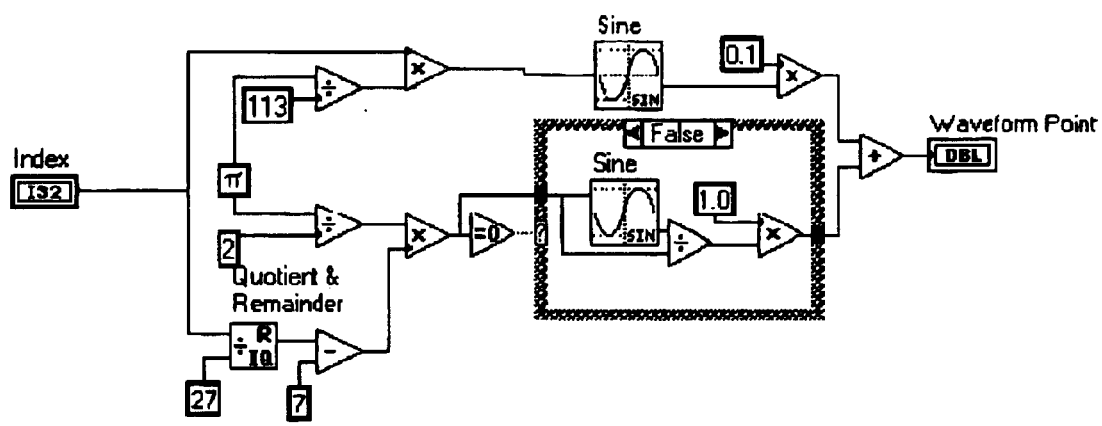

In step 202, the user may specify the desired functional interface for the shared library entry point function for the graphical program code. A graphical program may have an associated set of inputs and outputs. In step 202, the user may map these inputs and outputs to entry point function parameters. For example, FIGS. 5A and 5B illustrate a graphical program and its user interface. As shown, the graphical program has an input labeled "Index" and an output labeled "Waveform Point", and the user interface panel has a user interface control and indicator corresponding to the input and output, respectively. If a graphical program runs as a standalone program, the graphical program may receive the values for its inputs via the corresponding user interface controls on the user interface panel and may display the output values in the corresponding user interface indicators.

However, if a graphical program is called through a shared library, the input values may be specified by parameters that the calling program passes to the shared library entry point function for the graphical program. Similarly, the output values for the graphical program may be written to output parameters that are passed by the calling program. In step 202, the user may define a functional interface specifying the desired mapping of the graphical program inputs/outputs to entry point function parameters. The user interface of FIG. 4B illustrates a button labeled "Define VI Prototype . . . " that enables a user to define a functional interface for each graphical program to be exported to the shared library. Step 202 may involve the user interactively specifying a functional interface, as described below. Alternatively, the graphical programming system may automatically create the functional interface based on the inputs and outputs of the graphical program.

The functional interface may be constructed or formatted in any way appropriate for a particular type of shared library. For example, for a DLL, a C-style functional interface may be specified. For example, an appropriate functional interface for the graphical program of FIG. 5B may be:
double GetWaveformPoint (int index);
Various aspects of step 202 are discussed in more detail below.

In step 204, the graphical programming system creates a shared library that includes the graphical program code, in response to a request by the user. The shared library may include an entry point function created according to the functional interface specified in step 202. As described below, a program may call into the graphical program code via the entry point function.

As described above, the user may choose multiple graphical programs, including graphical subprograms, to be exported. In one embodiment, a single shared library including the code for each graphical program is created. In another embodiment, the user may specify multiple shared libraries to generate and may specify how to distribute the graphical programs among these shared libraries.

It is noted that portions of the graphical program that are not necessary for operation when the graphical program is called from a shared library may be omitted from the library. For example, in many graphical programming systems, various resources or other information may be stored or wrapped in a single graphical program project or file. In the preferred embodiment, only executable code or other resources necessary for program execution are included in the shared library. Thus, in the example of FIGS. 5A and 5B, elements such as the block diagram information may be excluded from the shared library. Step 204 is discussed in more detail below.

Figure 3B:
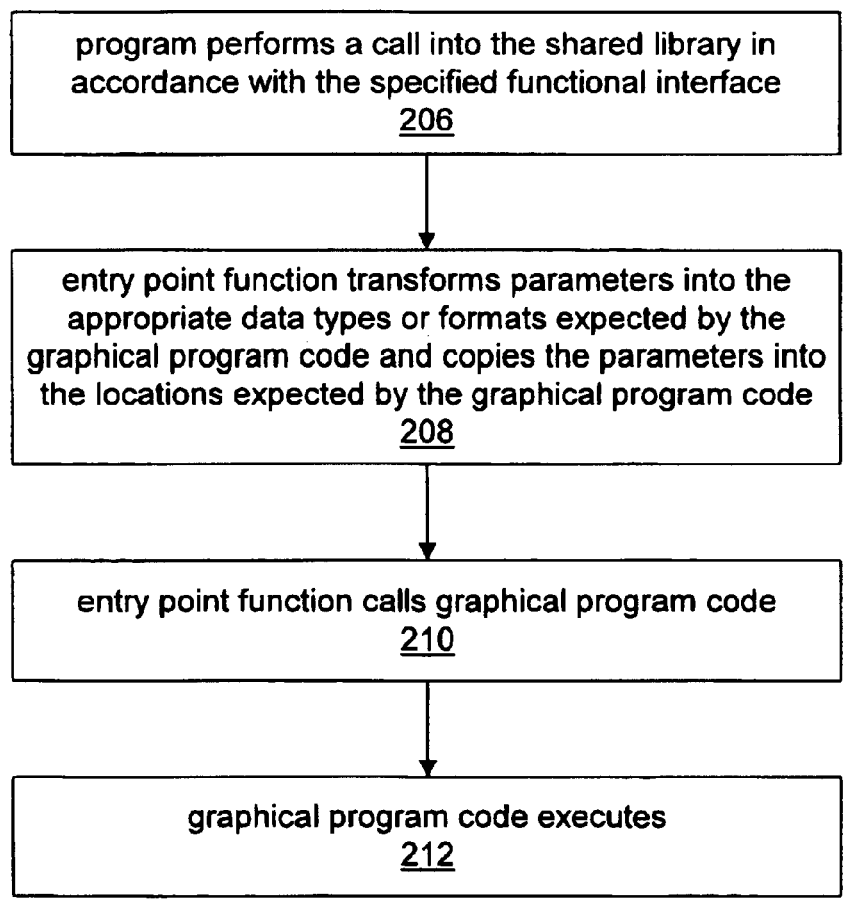
FIG. 3B is a flowchart diagram illustrating one embodiment of a method for using a shared library to invoke a graphical program.
Figure 4A:
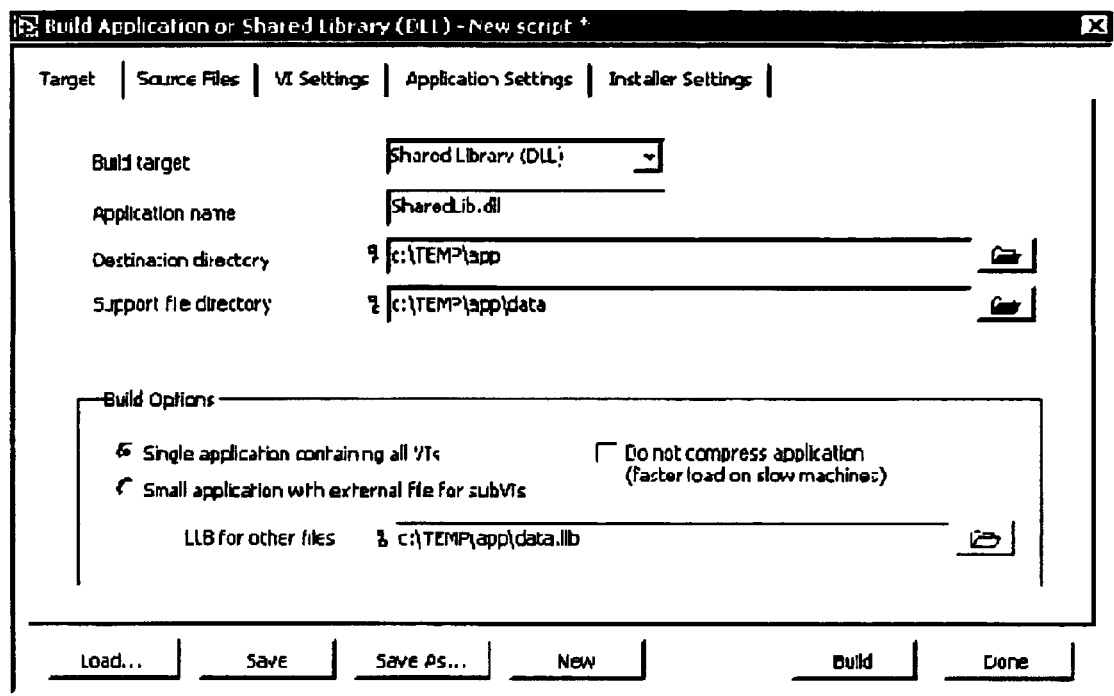
FIGS. 4A and 4B illustrate one embodiment of a user interface for creating a shared library.
Figure 4B:
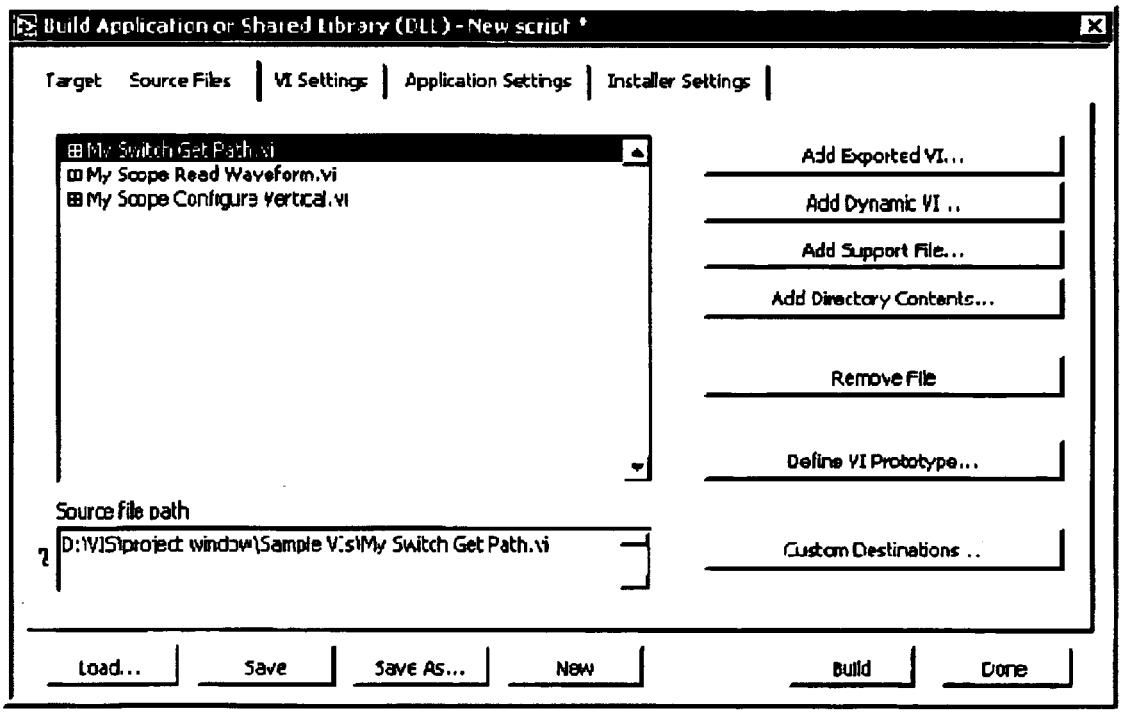

FIG. 3B—Using a Shared Library Including Graphical Program Code

FIG. 3 is a flowchart diagram illustrating one embodiment of a method for using a shared library to invoke a graphical program. In step 206, a program performs a call into the shared library such as created in step 204. The program performs the call in accordance with the functional interface specified in step 202, i.e., by calling the entry point function for the graphical program. Step 206 may be performed in any of various ways, as appropriate to a particular type of shared library, programming language, computing platform, etc. Information on using shared libraries in conjunction with various platforms and development environments is available in literature related to the art.

In step 208, the entry point function called in step 206 may manipulate input parameters into appropriate data types or formats expected by the graphical program code and/or may copy input parameters into locations expected by the graphical program code. Step 208 is discussed in more detail below.

In step 210, the entry point function may call the graphical program code. As shown in step 212, the graphical program code then executes. The entry point function for the graphical program code preferably performs all necessary measures, such as transforming data types, etc., to enable the graphical program code to execute just as if running as a standalone program and receiving input values via an associated user interface panel.

Once the graphical program code returns, the entry point function may copy any resulting output values from locations where they are stored by the graphical program code to the output parameters passed by the calling program. Similarly as described above, the entry point function may perform any necessary translations to the data in order to change it from a type or format produced by the graphical program to a type or format appropriate for the output parameters.

As noted above, FIGS. 3A and 3B represents particular embodiments of methods for creating and using a shared library to call a graphical program, and numerous alternative embodiments are contemplated. Various steps of FIGS. 3A and 3B may be altered, combined, reordered, omitted, added, etc.

For example, steps 208 and 210 of FIG. 3B pertain to an embodiment in which an entry point function is first called into, and this entry point function then transforms parameters into a format expected by the graphical program code. It is noted that in other embodiments, the graphical program code may be fully conformant with the shared library specifications and calling conventions so that such intermediate steps are unnecessary. The graphical program may utilize and/or support the same data types in the same formats as the shared library specification, making data transformation unnecessary. Similarly, the graphical program code may be structured in the shared library file so that the graphical program is called directly by external programs, rather than being wrapped in an entry point function as described with reference to FIG. 3B.

As another example, step 202 is described in terms of the user specifying a functional interface for the entry point function that calls the graphical program. In one embodiment, a default functional interface may be automatically provided, based on the inputs and outputs of the graphical program, and it may not be necessary to change this provided functional interface.

As another example, FIGS. 3A and 3B are discussed in terms of a particular graphical program and its associated functional interface and shared library entry point function. However, as noted above, multiple graphical programs or subprograms may be exported to a shared library and called by a program.

Figure 6:
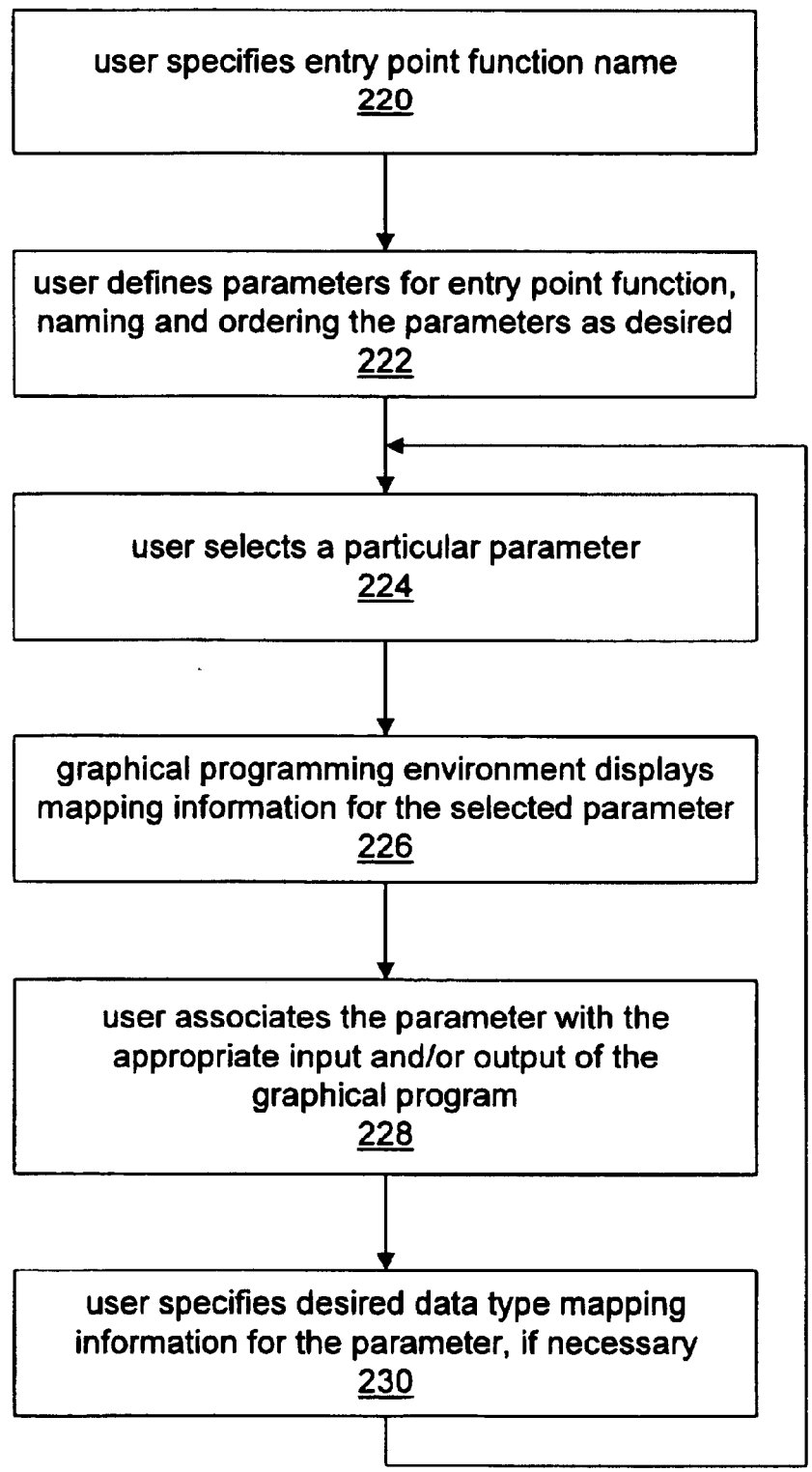
FIG. 6 is a flowchart diagram illustrating one embodiment of a method for specifying a functional interface for a shared library entry point function for a graphical program.

FIG. 6—Specifying a Functional Interface

FIG. 6 is a flowchart diagram illustrating one embodiment of a method for specifying a functional interface for a shared library entry point function for a graphical program, as performed in step 202 of FIG. 3A. FIG. 6 is discussed in terms of the user interface shown in FIG. 7. However, a functional interface may be specified in any of various other ways.

Figure 7:
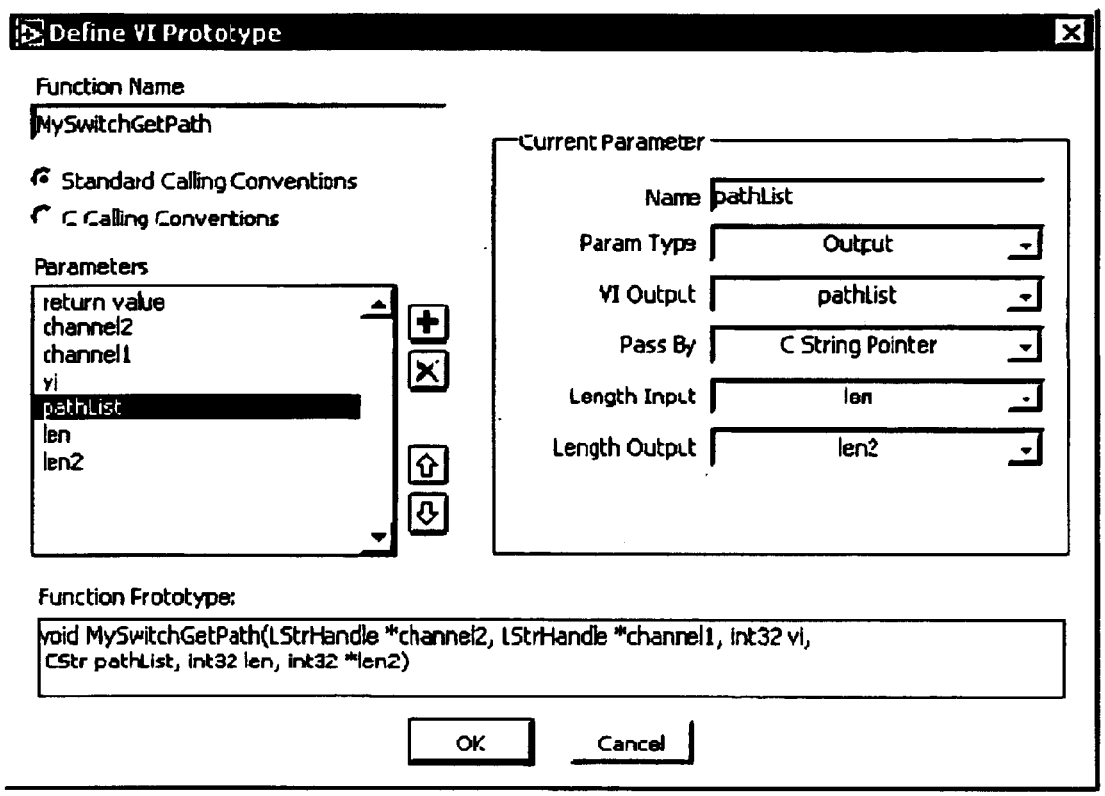
FIG. 7 illustrates an exemplary user interface for specifying a functional interface for a shared library entry point function for a graphical program.

In step 220, the user may specify a name for the entry point function. The name may need to adhere to particular naming conventions. For example, for a DLL entry point, the name may need to be a legal C identifier. A function name field is illustrated in FIG. 7, where the specified name is "MySwitchGetPath". A default name based on the graphical program name or other information may be automatically supplied.

In step 222, the user may define parameters for the entry point function. These parameters may appear in a parameter list, as shown in FIG. 7. Using the FIG. 7 user interface, the user may define a new parameter by clicking the "+" button and entering the desired name for the new parameter. FIG. 7 also illustrates an "X" button for deleting parameters from the list and arrow buttons for changing the order of the parameters.

In addition to defining the parameters, the user may also specify the graphical input and/or output that the parameter corresponds to, the data type of the parameter, and other information for each parameter. In the FIG. 7 user interface, the portion framed by the "Current Parameter" label displays such information for the parameter currently selected in the parameter list.

In step 224, the user selects a particular parameter from the list, e.g., by clicking on the parameter. In response, the "Current Parameter" information is updated to display the information for the selected parameter, as shown in step 226. The user may then update the information as desired. As described above, each parameter in the parameter list is associated with an input and/or output to the graphical program. In step 228, the user specifies this association. Step 228 may involve specifying a parameter type for the selected parameter. For example, FIG. 7 illustrates a "Param Type" field enabling the user to specify a parameter type. The valid parameter types may depend on the particular type of shared library being created. For example, for a Windows DLL, parameters may be input parameters, output parameters, input/output parameters, etc. Thus, the FIG. 7 user interface may allow the user to choose one of these types or choose "return value" to indicate that the parameter represents the return value for the function.

The valid settings for various parameter information fields may depend on settings of other fields. The user interface preferably automatically updates the fields when possible and prevents the user from choosing invalid values. For example, in FIG. 7, the "pathlist" parameter is specified to be an output parameter. Thus, the field for specifying the input or output to associate with the parameter is labeled "VI Output", and only outputs of the graphical program appear in the selection ring, for the user to specify which output the "pathlist" parameter is associated with. Similarly, if a parameter is specified to be an input parameter, then the user interface may only allow the user to associate the parameter with an input to the graphical program.

If the parameter is specified to be an input/output parameter, then the user interface may allow the user to select both a graphical program input and an output to associate the parameter with. However, since the input and output need to be of the same type, the user interface may slave the output selection to the input selection, such that only outputs of the same type as the selected input are displayed. If there are no graphical program inputs and outputs of the same type, then the user interface may prevent the user from specifying that a parameter is an input/output parameter.

In various embodiments, graphical programs may utilize inputs or outputs that do not map directly to the data types of parameters passed in to a shared library by a calling program. For example, in one embodiment, a graphical program may store a string as a handle. However, other programming environments, such as text-based programming environments, generally represent strings differently, e.g., as C-strings or Pascal-strings. The user interface may thus allow the user to specify various criteria that can be used to massage the parameter passed by the calling program into the appropriate format for use by the graphical program. In step 230, the user may specify this mapping criteria.

FIG. 7 illustrates such an example. In FIG. 7, the "pathStr" graphical program output is a string type and is treated as a handle by the graphical program. Thus, the output parameter passed by the calling program must be converted to a handle that the graphical program can use to store the output value in. In this example, the graphical programming environment enables a shared library to accept strings of different representations from calling programs, e.g., C-strings or Pascal-strings. If the user specifies that the "pathList" parameter will be passed as a C-string, then a length parameter should also be passed, to inform the graphical program of the buffer size, so that the buffer will not be overwritten. Thus, the user interface displays a "Length Input" field, allowing the user to specify a parameter in the parameter list as the length parameter. Similarly, the user interface displays a "Length Output" field, allowing the user to specify a parameter in the parameter list as a length written parameter, which informs the calling program of how many bytes were actually written to the output buffer. The user interface may automatically add the length and length written parameters to the parameter list when the user specifies that the string passed in is a C-string.

When the graphical programming system generates the shared library, the library may be generated with an entry point function that handles any necessary data type mapping. (As noted above, in some embodiments, this type of data type mapping may not be necessary.) The entry point function has both knowledge of the parameter data type passed in by the calling program and knowledge of the data type expected by the graphical program. Thus the entry point function is constructed in such a way as to perform the appropriate mapping. The entry point function may use information specified by the user, such as the CStr option described above, in determining how to perform the mapping. For other situations, parameters of a certain data type may always be mapped to graphical program data types in a particular way, such that the user need not specify additional mapping information.

In addition to the string data type transformation example discussed above, any of various other types of data type transformations may be performed. As one example, in one embodiment, a graphical programming system is operable to generate entry point functions that map ActiveX data types to or from data types native to the graphical programming system. For example, an ActiveX variant data type may be converted to a variant data type proprietary to the graphical programming system. As another example, the use of array data types may involve data type transformation. Similarly as in the string example above, arrays may be passed from external programs using different representations, e.g., as a handle to the array or as a pointer to the array data. As another example, the entry point function may convert between numeric data types, e.g., converting a floating point parameter to an integer data type.

In addition to transforming data types as required, an entry point function may also perform other actions, such as copying the input parameter values to a location expected by the graphical program or allocating output storage in a location expected by the graphical program. For example, in one embodiment, graphical programs utilize a "parameter table", that is a memory area that stores the inputs and outputs of a graphical program. The entry point function may thus initialize the parameter table for the graphical program before the graphical program executes. Input/output initialization may be performed in any of various ways, depending on how a particular graphical programming system and a particular type of shared library represent or store parameter data.

As noted above, FIG. 6 represents one embodiment of a method for specifying a functional interface, and various steps of FIG. 6 may be altered, combined, reordered, omitted, added, etc. For example, FIG. 6 is discussed in terms of first defining and ordering the parameters as desired, and then specifying a parameter type and mapping information for each parameter. However, the user may of course perform an interleaved process of defining a parameter, setting information for the parameter, defining another parameter, etc. It is noted that in some cases, not every input and output of a graphical program needs to have a corresponding parameter in the functional interface. For example, some graphical program inputs may have default values that may be used.

As another example of a variation of the above description, the graphical programming environment may be operable to automatically provide a default functional interface, based on the graphical program inputs and outputs or based on a template defined by the user. Thus, the user may not need to manually define the list of parameters and can simply change this default functional interface as desired.

The graphical programming environment may support other features in addition to those described above. For example, the user interface of FIG. 7 allows the user to specify a calling convention for the entry point function, e.g. standard calling convention or C calling convention.

Figure 8:
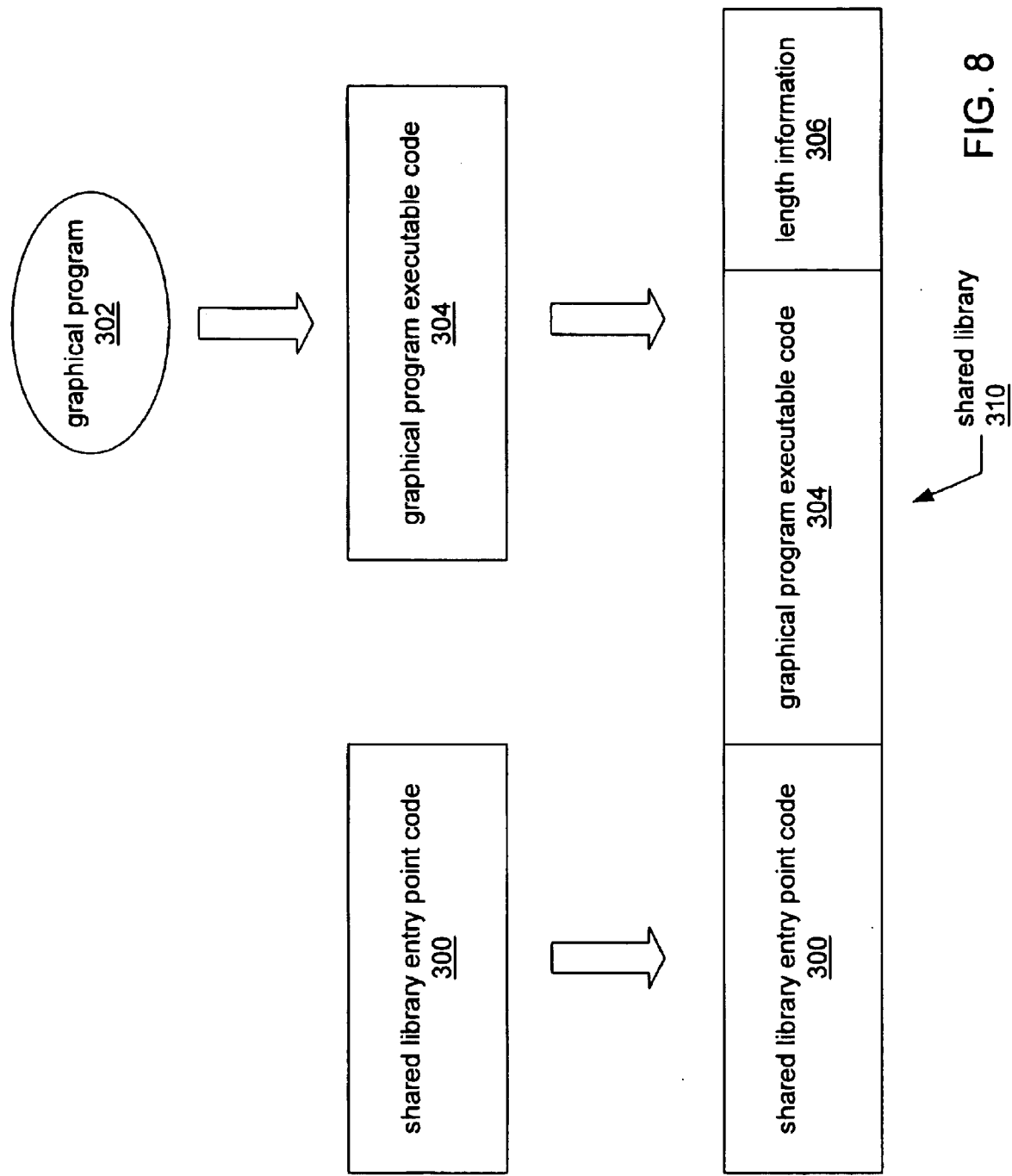
FIG. 8 illustrates one embodiment of creating a shared library including graphical program code.
Figure 9:
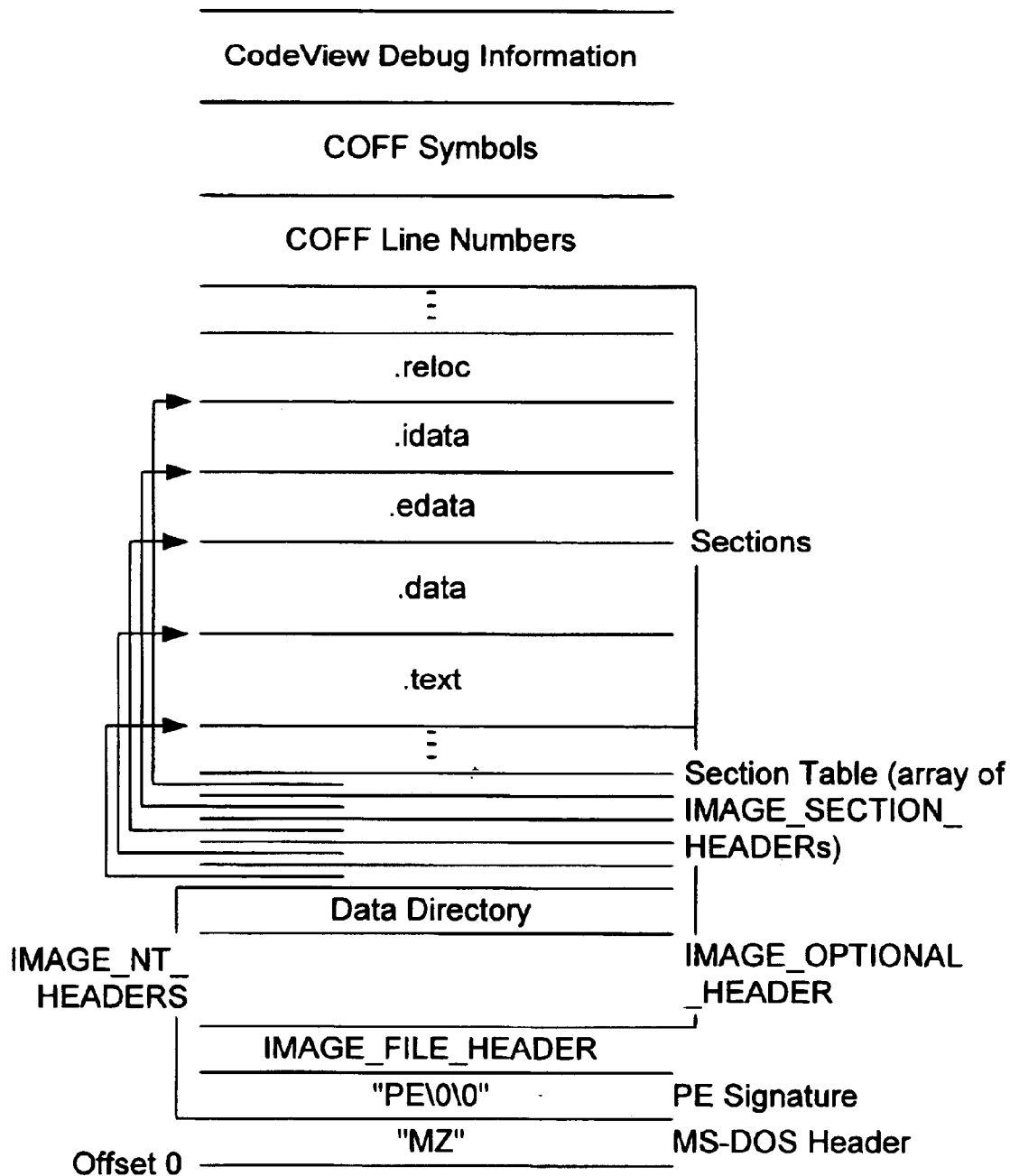
FIG. 9 (prior art) illustrates various elements of a 32-bit Windows DLL.

FIGS. 8–9: Creating a Shared Library

Once the desired functional interface for a graphical program has been determined, a shared library usable to call into the graphical program code may be created, as performed in step 204 of FIG. 3A. FIG. 8 illustrates one embodiment of creating a shared library.

In various graphical programming systems, the graphical program 302 shown in FIG. 8 may be stored or represented in various ways. For example, the graphical program 302 may be associated with user interface panels, block diagrams, and other resources, as well as the actual executable program code. When creating the shared library, the graphical program is preferably stripped of unnecessary elements, so that only graphical program executable code 304, as well as additional information or resources needed for program execution, are included in the shared library.

Such additional information necessary for program execution may include one or more user interface panels. The graphical programming system may attempt to automatically detect whether the user interface panel(s) associated with a graphical program file are used by the exported program, and thus whether the panel information should be included in the shared library. However, in some cases it may not be possible to detect the user interface panel usage, e.g., if the graphical programming system supports runtime specification and loading of user interface panels. Thus, the system may determine which user interface panel(s) to include by default, but may enable the user to override or change these choices.

As described above, when a program calls into the graphical program code via a shared library, the program may call into an entry point function, and this entry point function may perform any necessary modification or copying of parameters and may then invoke the graphical program code. Block 300 of FIG. 8 represents the entry point executable code to be included in the shared library. In one embodiment, the graphical programming system may be enabled to generate the entry point code 300. In an alternative embodiment, the graphical programming system may generate high-level program statements for the entry point function, e.g., C code, that implements the desired behavior of transforming parameter data types, etc. The graphical programming system may then compile the entry point function code to produce the entry point executable code 300. The graphical programming system may invoke an external compiler to compile the entry point code, e.g., by searching a system registry to determine an appropriate compiler.

As shown in FIG. 8, the entry point executable code 300 and the graphical program executable code 304 may be included in a shared library 310. The shared library 310 may also include other information, such as the user interface information described above. As noted above, a user may choose to export multiple graphical programs or subprograms to a single shared library. Thus, the entry point code 300 may include executable code for multiple entry points, where each entry point is associated with a particular graphical program or subprogram included in the shared library and is operable to perform any necessary parameter manipulations for interfacing with the program or subprogram, as described above. Thus, the graphical program executable code 304 may also include executable code for multiple graphical programs or subprograms.

As shown, the shared library may also include length information 306 at the end. The length information 306 may specify the length of the entry point executable code 300, enabling the beginning of the graphical program executable code 304 to be located.

FIG. 8 is an abstract diagram illustrating various elements of a shared library relevant to the present invention. As noted above, the present system and method may be utilized to create any of various types of shared libraries, as supported by particular computing platforms or operating systems. Thus, in an actual implementation of a shared library, elements 300, 304, and 306 may be written to the shared library in various ways, depending on the particular shared library specification, and the shared library may also include various other elements.

For example, FIG. 9 is a diagram illustrating various elements of a 32-bit Windows DLL. In one embodiment, the shared library entry point executable code 300 may be constructed according to this format. For more information on the Win32 executable file format, please refer to "Peering Inside the PE: A Tour of the Win32 Portable Executable File Format," available from the Microsoft Developer Network library.

Figure 10:
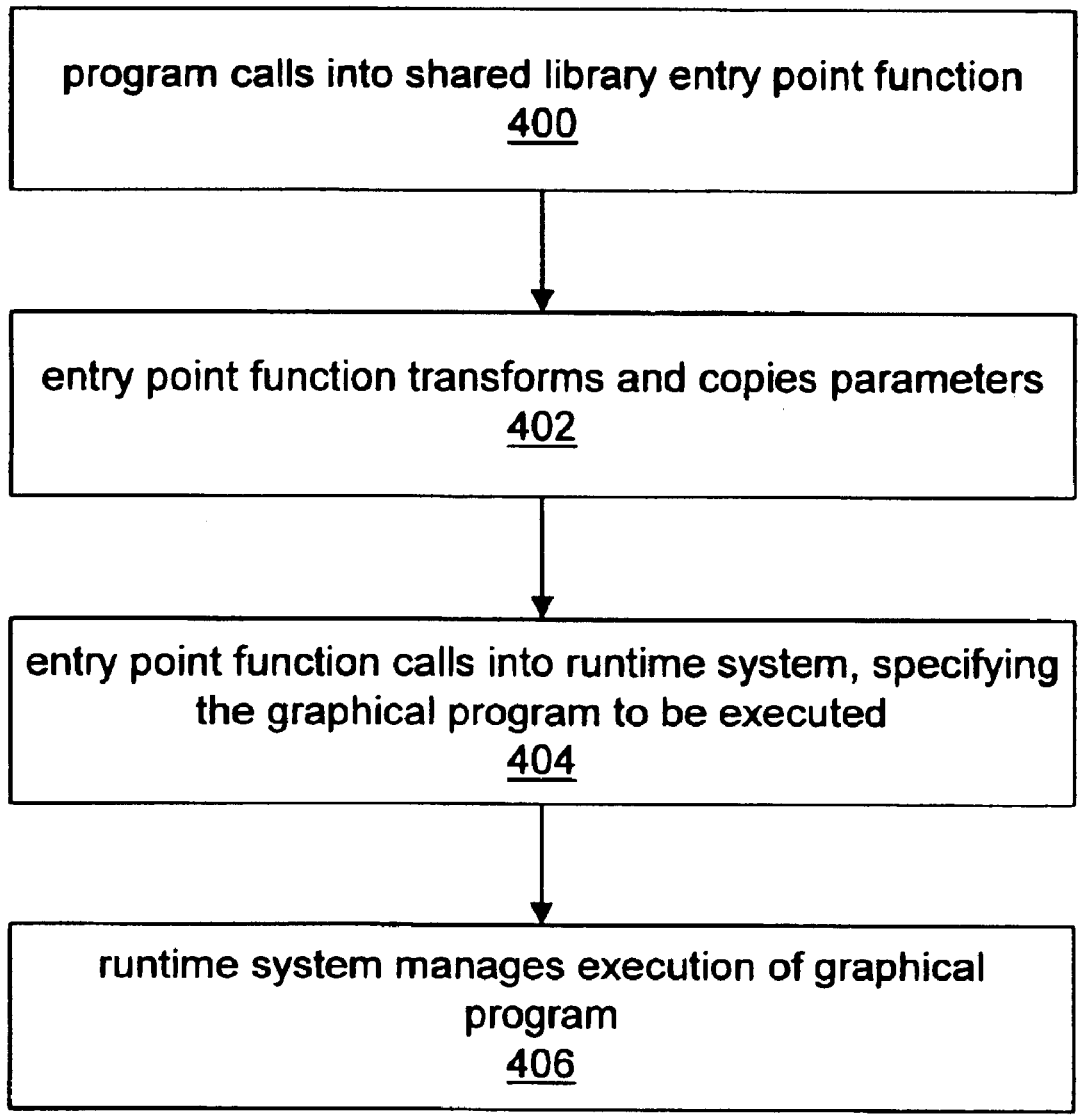
FIG. 10 is a flowchart diagram illustrating an embodiment in which a runtime execution system manages the execution of a graphical program invoked via a shared library.

FIG. 10—Runtime Execution

In various embodiments, the execution of a graphical program invoked via a shared library may be managed by a runtime execution system associated with the graphical programming system used to create the shared library. FIG. 10 is a flowchart diagram illustrating such an embodiment. Steps 400 and 402 of FIG. 10 are similar to steps 206 and 208 of FIG. 3B, discussed above.

As shown in step 404 of FIG. 10, the entry point function may interface with the runtime execution system, specifying the graphical program to be executed. The graphical program to be executed may be specified in any of various ways appropriate for a particular implementation, e.g., by passing an index, memory location, or name enabling the runtime system to identify the referenced graphical program.

In the preferred embodiment, the shared library includes an initialization routine that the operating system is enabled to call when the shared library is loaded. This initialization routine may locate the graphical program code in the shared library, using the length information described above with reference to FIG. 8. The initialization routine may also interface with the runtime execution system to prepare for running the graphical program(s) included in the shared library, e.g., by pre-loading the graphical program(s). Thus, when a runtime call into the shared library is received, the referenced graphical program may be loaded and ready to run.

In step 406, the runtime system manages the execution of the referenced graphical program. Step 406 may be implemented in various ways, depending on the particular graphical programming system. For example, the graphical programming system may utilize a "scheduling" execution model in which various code blocks are scheduled for execution. Thus, the referenced graphical program may first be scheduled or queued and may then be run. During execution, the graphical program may call into runtime libraries provided by the runtime execution system.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for invoking execution of a graphical program, the method comprising:

selecting a graphical program in response to user input, wherein the graphical program comprises a plurality of connected nodes which visually indicate functionality of the graphical program, wherein the graphical program comprises at least one input received by a first node of the graphical program and at least one output produced by a second node of the graphical program;

specifying a functional interface for the graphical program, wherein said specifying comprises mapping the at least one input and the at least one output to respective entry point function parameters, wherein the functional interface is specific to the graphical program;

creating a shared library comprising the graphical program, wherein the shared library includes an entry point function created according to the functional interface specified for the graphical program;

calling the entry point function of the shared library, wherein the entry point function is associated with the graphical program, and wherein said calling the entry point function comprises providing values for the respective input parameters in accordance with said mapping;

the entry point function directly invoking the graphical program in response to said calling the entry point function;

the graphical program executing in response to said invoking the graphical program.

2. The method of claim 1,
wherein the graphical program comprises executable code included in the shared library.

3. The method of claim 1,
wherein said calling the entry point function comprises passing one or more parameters to the entry point function;
wherein said entry point function invoking the graphical program comprises the entry point function passing the one or more parameters to the graphical program.

4. The method of claim 1, wherein the graphical program produces one or more output values, the method further comprising:
the graphical program returning the one or more output values to the entry point function;
the entry point function returning the one or more output values.

5. The method of claim 1, wherein said calling the entry point function comprises passing a parameter to the entry point function, the method further comprising:
the entry point function transforming the parameter into a format expected by the graphical program;
the entry point function passing the transformed parameter to the graphical program.

6. The method of claim 1, wherein said calling the entry point function comprises passing a parameter to the entry point function, the method further comprising:
the entry point function copying the parameter into a location expected by the graphical program.

7. The method of claim 1,
wherein said calling the entry point function is performed by a particular thread;
wherein the graphical program executes within the context of the particular thread.

8. The method of claim 1,
wherein said creating the shared library comprises excluding a portion of the graphical program that is not necessary for execution.

9. The method of claim 8,
wherein the portion of the graphical program that is not necessary for execution comprises information from the group consisting of:
user interface display information and block diagram information.

10. The method of claim 1,
wherein the shared library is one of:
a Windows DLL, a Unix shared library, and a Macintosh code fragment.

11. The method of claim 1,
wherein said calling the entry point function of the shared library is performed by a program created using a text-based programming language.

12. A computer-implemented method for creating a shared library including a graphical program, the method comprising:
selecting a graphical program in response to user input, wherein the graphical program comprises a plurality of connected nodes which visually indicate functionality of the graphical program, wherein the graphical program comprises at least one input received by a first node of the graphical program and at least one output produced by a second node of the graphical program;
specifying a functional interface for the graphical program, wherein said specifying comprises mapping the at least one input and the at least one output to respective entry point function parameters, and wherein the functional interface is specific to the graphical program;

creating a shared library comprising the graphical program, wherein the shared library includes a function created according to the functional interface specified for the graphical program, and wherein the function takes values for the respective input parameters in accordance with said mapping as inputs;

wherein the graphical program is directly invocable via the functional interface.

13. The method of claim 12, wherein the graphical program has associated inputs and outputs;

wherein said specifying a functional interface for the graphical program comprises a user specifying a mapping of the associated inputs and outputs to parameters in a function declaration.

14. The method of claim 12, wherein the graphical program has associated inputs and outputs;

wherein said specifying a functional interface for the graphical program comprises automatically mapping the associated inputs and outputs to parameters in a function declaration.

15. The method of claim 12, wherein, in response to being invoked by a program, the shared library function created according to the functional interface specified for the graphical program is operable to invoke the graphical program.

16. A system comprising:

a computer including a CPU and memory;

a shared library comprising a graphical program and stored in the memory of the computer, wherein the shared library includes an entry point function associated with the graphical program, wherein the graphical program comprises a plurality of connected nodes which visually indicate functionality of the graphical program;

wherein at least one input and at least one output of the graphical program map to respective entry point function parameters in accordance with a specified functional interface specific to the graphical program;

wherein, in response to a program calling the entry point function, the entry point function is operable to directly invoke the graphical program, wherein said calling the entry point function comprises providing values for the respective input parameters in accordance with said mapping.

17. The system of claim 16, wherein the graphical program comprises executable code included in the shared library.

18. The system of claim 16, wherein said calling the entry point function comprises passing one or more parameters to the entry point function;

wherein said entry point function invoking the graphical program comprises the entry point function passing the one or more parameters to the graphical program.

19. The system of claim 16, wherein the graphical program produces one or more output values;

wherein the graphical program returns the one or more output values to the entry point function;

wherein the entry point function returns the one or more output values.

20. The system of claim 16, wherein said calling the entry point function comprises passing a parameter to the entry point function;

wherein the entry point function transforms the parameter into a format expected by the graphical program;

wherein the entry point function passes the transformed parameter to the graphical program.

21. The system of claim 16, wherein said calling the entry point function comprises passing a parameter to the entry point function;

wherein the entry point function copies the parameter into a location expected by the graphical program.

22. The system of claim 16, wherein said calling the entry point function is performed by a particular thread;

wherein the graphical program executes within the context of the particular thread.

23. The system of claim 16, wherein the shared library is one of:

a Windows DLL, a Unix shared library, and a Macintosh code fragment.

24. The system of claim 16, wherein said calling the entry point function of the shared library is performed by a program created using a text-based programming language.

25. A computer-implemented system for creating a shared library including a graphical program, the system comprising:

a computer including a CPU and memory;

a graphical programming system stored in the memory;

wherein the graphical programming system is operable to:

select a graphical program in response to user input, wherein the graphical program comprises a plurality of connected nodes which visually indicate functionality of the graphical program, wherein the graphical program comprises at least one input received by a first node of the graphical program and at least one output produced by a second node of the graphical program;

specify a functional interface for the graphical program, wherein said specifying comprises mapping the at least one input and the at least one output to respective entry point function parameters, and wherein the functional interface is specific to the graphical program;

create a shared library comprising the graphical program, wherein the shared library includes a function created according to the functional interface specified for the graphical program, and wherein the function takes values for the respective input parameters in accordance with said mapping as inputs;

wherein the graphical program is directly invocable via the functional interface.

26. The system of claim 25, wherein the graphical program has associated inputs and outputs;

wherein said specifying a functional interface for the graphical program comprises a user specifying a mapping of the associated inputs and outputs to parameters in a function declaration.

27. The system of claim 25, wherein the graphical program has associated inputs and outputs;

wherein said specifying a functional interface for the graphical program comprises automatically mapping the associated inputs and outputs to parameters in a function declaration.

28. The system of claim 25, wherein, in response to being invoked by a program, the shared library function created according to the functional interface specified for the graphical program is operable to directly invoke the graphical program.

29. A memory medium comprising program instructions operable to:

specify a functional interface for a graphical program, wherein the graphical program comprises a plurality of connected nodes which visually indicate functionality of the graphical program, wherein the graphical program comprises at least one input received by a first node of the graphical program and at least one output produced by a second node of the graphical program, wherein said specifying comprises mapping the at least one input and the at least one output to respective entry point function parameters, and wherein the functional interface is specific to the graphical program;

create a shared library comprising the graphical program, wherein the shared library includes an entry point function created according to the functional interface specified for the graphical program;

call an entry point function of the shared library, wherein the entry point function is associated with the graphical program, and wherein said calling the entry point function comprises providing values for the respective input parameters in accordance with said mapping;

directly invoke the graphical program in response to said calling the entry point function, wherein the entry point function directly invokes the graphical program;

execute the graphical program in response to said invoking the graphical program.

30. The memory medium of claim 29, wherein the graphical program comprises executable code included in the shared library.

31. The memory medium of claim 29, wherein said calling the entry point function comprises passing one or more parameters to the entry point function;

wherein said invoking the graphical program comprises the entry point function passing the one or more parameters to the graphical program.

32. The memory medium of claim 29, wherein the graphical program produces one or more output values wherein the graphical program returns the one or more output values to the entry point function;

wherein the entry point function returns the one or more output values.

33. The memory medium of claim 29, wherein said calling the entry point function comprises passing a parameter to the entry point function;

wherein the entry point function transforms the parameter into a format expected by the graphical program;

wherein the entry point function passes the transformed parameter to the graphical program.

34. The memory medium of claim 29, wherein said calling the entry point function comprises passing a parameter to the entry point function;

wherein the entry point function copies the parameter into a location expected by the graphical program.

35. The memory medium of claim 29, wherein said calling the entry point function is performed by a particular thread;

wherein the graphical program executes within the context of the particular thread.

36. The memory medium of claim 29, wherein said creating the shared library comprises excluding a portion of the graphical program that is not necessary for execution.

37. The memory medium of claim 36, wherein the portion of the graphical program that is not necessary for execution comprises information from the group consisting of:

user interface display information and block diagram information.

38. A memory medium comprising program instructions operable to:

specify a functional interface for a graphical program, wherein the graphical program comprises a plurality of connected nodes which visually indicate functionality of the graphical program, wherein the graphical program comprises at least one input received by a first node of the graphical program and at least one output produced by a second node of the graphical program, wherein said specifying comprises mapping the at least one input and the at least one output to respective entry point function parameters, and wherein the functional interface is specific to the graphical program; and create a shared library comprising the graphical program, wherein the shared library includes an entry point function created according to the functional interface specified for the graphical program, wherein the entry point function takes values for the respective input parameters in accordance with said mapping as inputs, and wherein the entry point function is callable to directly invoke the graphical program.

* * * * *